United States Patent [19]

Nestor

[11] 4,384,167
[45] May 17, 1983

[54] BREAK-OUT PROTECTOR AND WIRING HARNESS INCLUDING SAME

[75] Inventor: Charles R. Nestor, Niles, Ohio

[73] Assignee: General Motors Corporation, Detroit, Mich.

[21] Appl. No.: 350,266

[22] Filed: Feb. 19, 1982

[51] Int. Cl.³ ............................................. H02G 3/04
[52] U.S. Cl. ............................... 174/71 R; 174/72 A; 174/135; 174/167
[58] Field of Search ................ 174/71 R, 72 R, 72 A, 174/135, 136, 138 R, 167

[56] References Cited

U.S. PATENT DOCUMENTS

| 2,258,745 | 10/1941 | Dewey et al. | 174/136 X |
| 2,530,812 | 11/1950 | Carmer, Jr. et al. | 174/135 |
| 3,192,377 | 6/1965 | Abolins | 174/72 R X |
| 3,312,777 | 4/1967 | Lovett, Jr. et al. | 174/71 R |
| 3,711,633 | 1/1973 | Ghirardi et al. | 174/135 |

FOREIGN PATENT DOCUMENTS 713738 11/1941 Fed. Rep. of Germany ... 174/138 R

Primary Examiner—Laramie E. Askin
Attorney, Agent, or Firm—F. J. Fodale

[57] ABSTRACT

A wiring harness has a main bundle of leads disposed in an axially slit, corrugated tube and break-out leads disposed in a break-out protector which extends through the slit of the corrugated tube. The break-out protector is a one piece molding of thermoplastic material. It has a tubular body with an outwardly flared skirt at one end which is disposed in the corrugated tube. The tubular body has an axial slit and the annular skirt has a communication slot for assemblying the break-out protector around the break-out leads. The tubular body has wedge-shaped portions and the annular skirt has a wavy edge to assist in assembly.

3 Claims, 6 Drawing Figures

BREAK-OUT PROTECTOR AND WIRING HARNESS INCLUDING SAME

This invention relates generally to a break-out protector and, more particularly, to a break-out protector for wiring harnesses which have a flexible, plastic, axially slit, corrugated tube which houses at least a portion of the wiring harness.

U.S. Pat. No. 3,711,633 granted to Paul S. Ghirardi and Eugene V. McGowan on Jan. 16, 1973 shows a wiring harness having a portion housed in such a tube and a "break-out" lead or leads which extend out of the tube through the axial slit at a desired location. In assemblying such wiring harnesses, the break-out lead or leads are usually branched off and bent perpendicular to the main bundle of leads and the axially slit, corrugated tube is then slid along the main bundle to the proper location. In such an operation, the break-out leads slide along the axial slit until the corrugated tube is properly located.

When the corrugated tube is made of a stiff, plastic material, such as nylon, the edges of the axial slit tend to saw or scrape the break-out leads as the corrugated tube is slid into place and, consequently, it may be desirable to provide a break-out protector.

Break-out protectors are already known from the U.S. Pat. No. 3,192,377 granted to Andrew Abolins on June 29, 1965 and U.S. Pat. No. 3,312,777 granted to Stanley L. Lovett, Jr. and Frederick W. Kuhls on Apr. 4, 1967.

However, in each of these prior art break-out protectors the break-out leads are threaded through a closed tube which makes assembly difficult and expensive. Another drawback is that each of the prior art break-out protectors have bases which are necessarily elongated for securing the break-out protector at the proper location on the main bundle of leads. Thus, the prior art break-out protectors are also bulky and involve considerable material expense.

The object of this invention is to provide a break-out protector which is economical, compact and easily assembled around the break-out leads.

A feature of the invention is that the break-out protector has a tubular body which is axially slit so that it can be easily assembled around the break-out leads without the necessity of a threading operation.

Another feature of the invention is that the break-out protector has a specially shaped annular skirt which properly orients the break-out protector on the break-out leads for assembly throughout.

Another feature of the invention is that the tubular body has at least one wedge-shaped portion to facilitate sliding an axially slit, corrugated tube over the main bundle of leads.

Yet another feature of the invention is that the means for retaining the break-out protector in assembly with the axially slit, corrugated tube is in the form of a short annular skirt which results in a compact design.

Still yet another feature of the invention is that the break-out protector is a one piece molding of thermoplastic material and thus economical to manufacture.

Other objects and features of the invention will become apparent to those skilled in the art as the disclosure is made in the following detailed description of a preferred embodiment of the invention as illustrated in the accompanying sheet of drawing in which.

Figure 1:
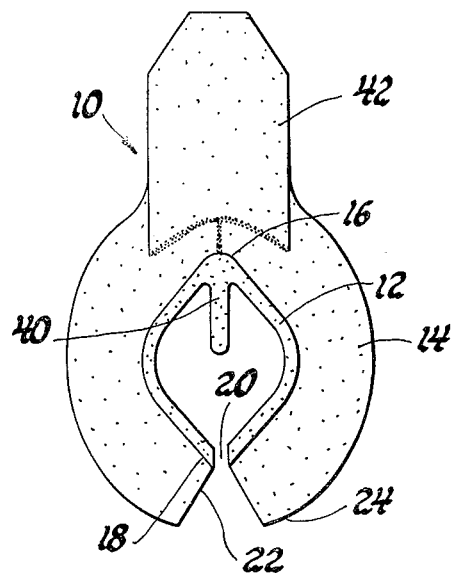
FIG. 1 is a top view of a break-out protector in accordance with this invention.
Figure 2:
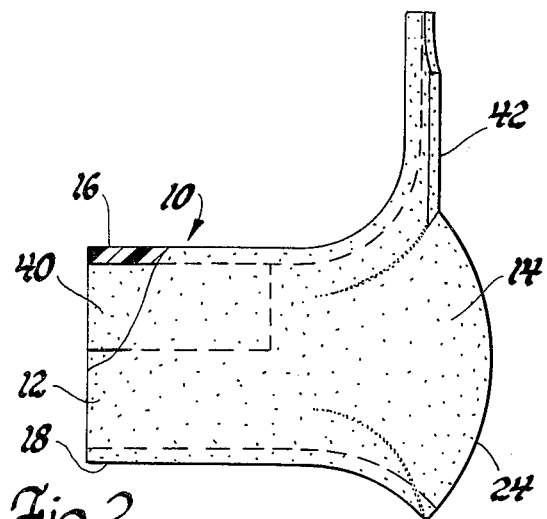
FIG. 2 is a side view of the break-out protector shown in FIG. 1.
Figure 3:
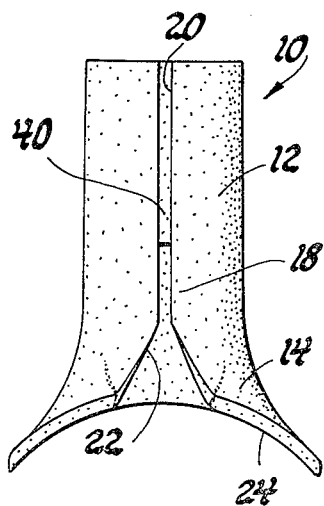
FIG. 3 is a front view of the break-out protector shown in FIG. 1.

Referring now to the drawing, FIGS. 1, 2 and 3 illustrate a break-out protector 10, per se. The break-out protector 10 is a one piece construction which is molded from a stiffly, resilient, thermoplastic material such as polypropylene. It comprises an axially slit, tubular body 12 having an outwardly flared annular skirt 14 at one end.

The wall of the tubular body 12 is elliptic-like in cross-section and has pronounced, wedge-shaped leading and trailing portions 16 and 18 at the major dimension as shown in FIG. 1.

The wall of the tubular body 12 also has an axial slit 20 which extends through the wall for the entire length of the tubular body 12. The axial slit 20 is preferably at the apex of the wedge-shaped trailing portion 18 and communicates with a triangular slot 22 extending to the edge 24 of the skirt 14.

Figure 4:
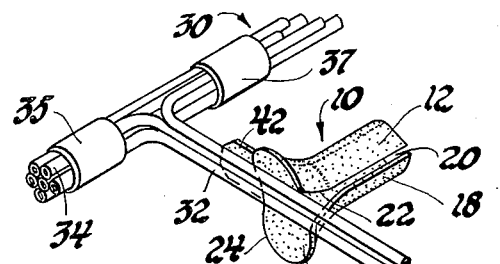
FIG. 4 is a perspective view showing the break-out protector positioned for assembly around the break-out leads of a wiring harness.

The edge 24 of the skirt 14 is wavy or sinusoidal and dips axially toward the tubular body 12 at the wedge-shaped leading portion 16 and again at the wedge-shaped trailing portion 18 to form a cradle for positioning the break-out protector 10 for assembly about the break-out leads of a wiring harness as shown in FIG. 4 and further explained below.

Figure 5:
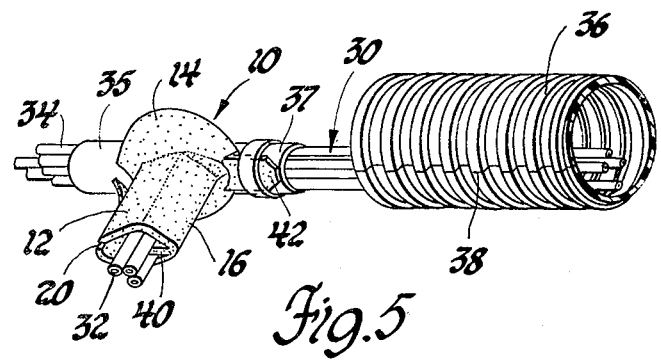
FIG. 5 is a perspective view showing the break-out protector assembled around the break-out leads of the wiring harness.
Figure 6:
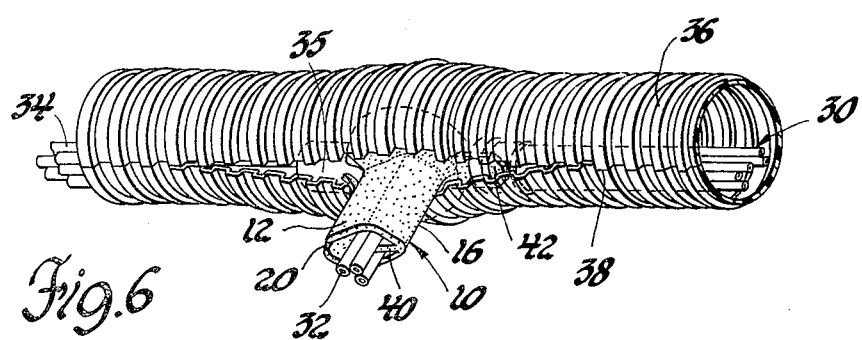
FIG. 6 is a perspective view showing the break-out protector and an axially slit, corrugated tube assembled to the wiring harness.

FIG. 4 shows a typical wiring harness 30 having a plurality of break-out leads 32 branched from and bent perpendicular to a main bundle of leads 34. The main bundle of leads 34 is taped at 35 and 37, fore and aft of the break-out leads 32. The skirt 14 of the break-out protector 10 is assembled to the wiring harness 30 by positioning the skirt 14 on the break-out leads 32 as shown in FIG. 4. The two diametrically opposed dips in the wavy edge 24 of the skirt 14 locate the break-out leads 32 transversely of the tubular body 14 so that break-out leads 32 cross over the wedge-shaped leading and trailing portions 16 and 18. The break-out protector 10 is then pivoted on the break-out leads 32 90° about the edge 24 which causes the break-out leads 32 to enter the tubular body 12 via the triangular slot 22 and axial slit 20. In the process, the triangular slot 22 guides the break-out leads 32 into the slit 20 and assists in opening the slit 20 at the adjacent end. The slit 20 then progressively widens along its length as the leads 32 pass into the tubular body 12. The break-out protector 10 is then slid down the break-out leads 32 until the flared skirt 14 rests on the main bundle of leads 34 so that the dips properly orient the tubular body 14 for assembly of an axially slit, corrugated tube 36 as shown in FIG. 5. The axially slit, corrugated tube 36 is then placed around the main bundle of leads 34 as shown in FIG. 5, by conventional techniques. The axially slit, corrugated tube 36 is then slid down the main bundle of leads 34 to the position shown in FIG. 6. In the process, the skirt 14 enters the open end of the corrugated tube 36 and the leading wedge-shaped portion 16 of the tubular body 12 spreads the axial slit 38 of the tube 36 as it travels to the position shown in FIG. 6. The break-out protector 10 is then retained in assembly by the skirt 14 and the selfclosing tendency of the axially slit, corrugated tube 36.

It is also possible to assemble the corrugated tube 36 from the opposite end because the trailing portion 18 is also wedge-shaped. If desired, the fittings shown in the Ghirardi et al patent may also be used in combination with the break-out protector 10. The break-out protector 10 may also include features such as an internal axial rib 40 for separating the break-out leads 32 in the tubular body 12 and an integral tongue 42 on the skirt 14 for taping the break-out protector 10 to the bundle 34 after it is positioned as shown in FIG. 5.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A break-out protector for a wiring harness having a main bundle of leads disposed in an axially slit tube and a break-out lead or leads which extend through the slit of the axially slit tube, said break-out protector being a one piece molding of thermoplastic material comprising:
   - a tubular body having an outwardly flared skirt at one end,
   - a wedge-shaped portion in the wall of the tubular body for spreading the slit of the tube,
   - an axial slit through the wall of the tubular body which extends for the entire length of the tubular body to pass a break-out lead or leads into the tubular body,
   - a wavy edge on the annular skirt which has diametrically opposed dips which are coplanar with the wedge-shaped portion of the tubular body, and
   - a slot in the annular skirt which extends from the wavy edge to the axial slit of the tubular body.

2. A break-out protector for a wiring harness having a main bundle of leads disposed in an axially slit tube and a break-out lead or leads which extend through the slit of the axially slit tube, said break-out protector being a one piece molding of thermoplastic material comprising:
   - a tubular body of elliptic cross-section having an outwardly flared skirt at one end,
   - a leading wedge-shaped portion and a diametrically opposed trailing wedge-shaped portion in the wall of the tubular body for spreading the slit of the tube,
   - an axial slit through the wall of the tubular body which is at the apex of the trailing wedge-shaped portion and which extends for the entire length of the tubular body to pass a break-out lead or leads into the tubular body,
   - a wavy edge on the annular skirt which has diametrically opposed dips which are coplanar with the wedge-shaped portion of the tubular body, and
   - a triangular slot in the annular skirt which extends from one of the dips in the wavy edge to the axial slit of the tubular body.

3. The combination comprising:
   - a wiring harness having a main bundle of leads disposed in an axially slit, corrugated tube of stiff plastic material and a break-out lead or leads which extend through the slit of the corrugated tube, and
   - a break-out protector around the break-out lead or leads,
   said break-out protector being a one piece molding of thermoplastic material and including:
   - a tubular body which is transverse to the corrugated tube and which has an outwardly flared skirt at one end which is disposed in the corrugated tube,
   - a wedge-shaped portion in the wall of the tubular body for spreading the slit of the corrugated tube,
   - an axial slit through the wall of the tubular body which extends for the entire length of the tubular body to pass the break-out lead or leads into the tubular body,
   - a wavy edge on the annular skirt which has diametrically opposed dips which are coplanar with the wedge-shaped portion of the tubular body,
   and
   - a slot in the annular skirt which extends from the wavy edge to the axial slit of the tubular body.

* * * * *